United States Patent [19]

Harlow

[11] Patent Number: 4,529,564
[45] Date of Patent: Jul. 16, 1985

[54] MANUFACTURE OF LOW DENSITY SINTERED POLYTETRAFLUOROETHYLENE INSULATED CABLE

[75] Inventor: Norman R. Harlow, Cornwall-on-Hudson, N.Y.

[73] Assignee: Carlisle Corporation, Buchanan, N.Y.

[21] Appl. No.: 552,496

[22] Filed: Nov. 17, 1983

Related U.S. Application Data

[63] Continuation-in-part of Ser. No. 410,491, Aug. 23, 1982, abandoned.

[51] Int. Cl.³ .............................................. B29D 23/01
[52] U.S. Cl. ............................ 264/127; 174/110 FC; 264/174; 264/288.8
[58] Field of Search .................... 264/127, 174, 288.8; 174/110 FC

[56] References Cited

U.S. PATENT DOCUMENTS 3,260,774  7/1966  Harlow ................................ 264/28
4,225,547  9/1980  Okita .................................. 264/127

Primary Examiner—James Lowe
Attorney, Agent, or Firm—Brooks Haidt Haffner & Delahunty

[57] ABSTRACT

A method for extruding, stretching and sintering polytetrafluoroethylene in a single pass operation to form articles of low density sintered polytetrafluoroethylene and articles such as electric cable (C) having low density, sintered polytetrafluoroethylene insulation (F) applied about a conductor (W) by such method.

6 Claims, 4 Drawing Figures

FIG. 1.
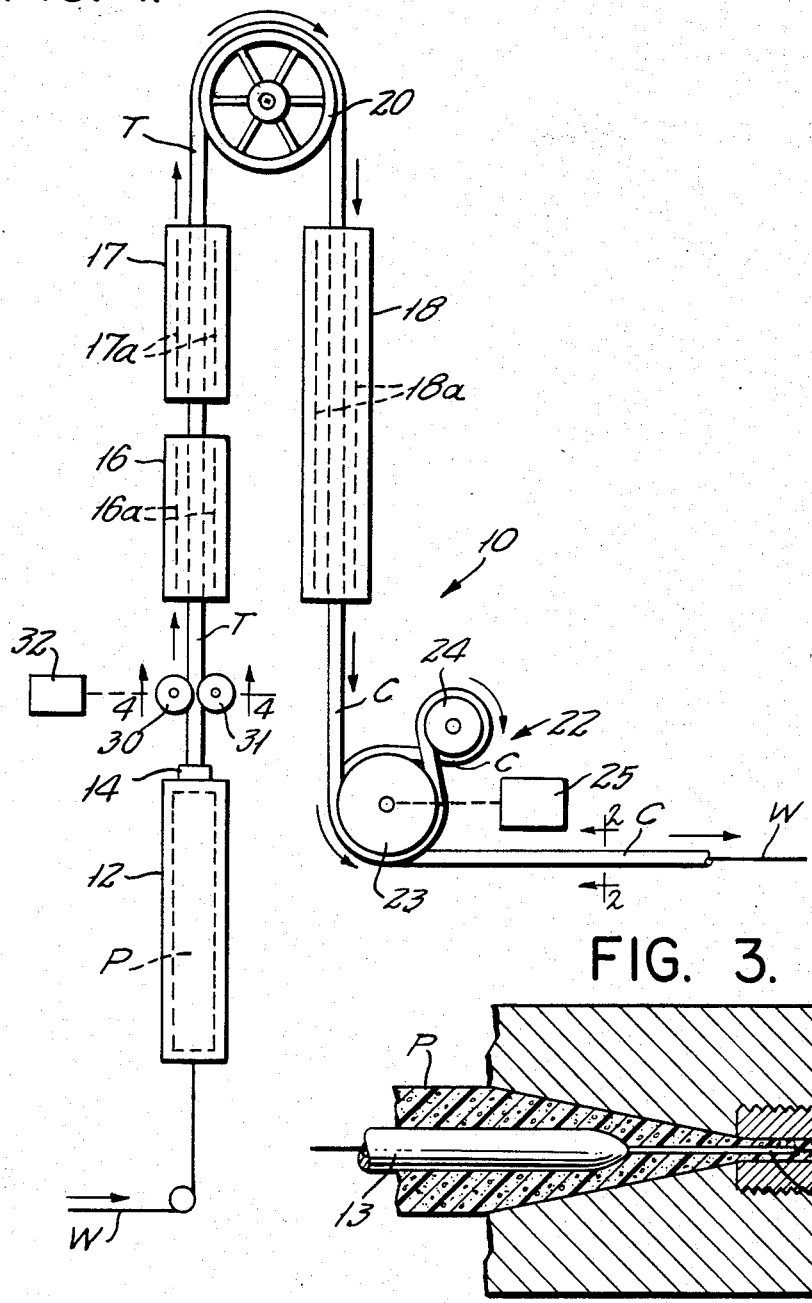
FIG. 2.
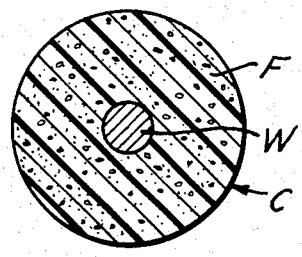
FIG. 3.
FIG. 4.
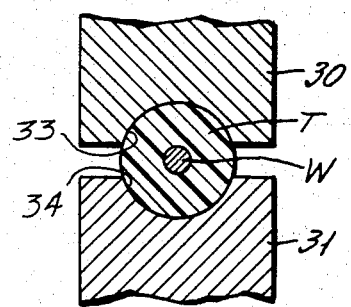

MANUFACTURE OF LOW DENSITY SINTERED POLYTETRAFLUOROETHYLENE INSULATED CABLE

This application is a continuation-in-part of application Ser. No. 410,491 filed Aug. 23, 1982, now abandoned.

This invention relates to tetrafluoroethylene polymers and in particular to manufacture of products comprising microporous, that is, low density sintered polytetrafluoroethylene. The invention provides a simple process for forming elongated articles of low density sintered tetrafluoroethylene polymers, for example, in the form of electrical insulation disposed about a conductive core, to produce a microporous polytetrafluoroethylene article, such as polytetrafluoroethylene insulated cable.

"Porous" solid dielectric materials have found favor as insulation for electric cables used in communications and in the computer industry because the reduction in dielectric constant produced by the incorporation of air in a solid dielectric greatly improves the electrical characteristics of cable made with such insulation. Moreover, the porosity introduced into the dielectric reduces the weight of the cable and concommitently its cost. The latter is a particularly important consideration in the case of relatively expensive dielectric materials such as polytetrafluoroethylene. The lower dielectric constant of "porous" dielectrics also reduces the overall size of insulation required to achieve a given characteristic cable impedance.

Low density sintered polytetrafluoroethylene which is microporous has heretofore been described (Japanese Patent Publication No. 13,560/67; U.S. Pat. No. 3,953,566, (for example). It has been made by a process of stretching and consequently is also called "stretched" or "expanded" polytetrafluoroethylene. As described in the literature, the product is made by extruding a paste of extrusion grade unsintered polytetrafluoroethylene admixed with an extrusion aid. The extrusion aid is removed from the extrudate after extrusion, and the product is then stretched in one or more directions and sintered while holding it in stretched condition. Stretching causes the polymer in effect to decrease in density without significant decrease in dimensions transverse to the direction of stretching. Stretched polymer can be produced which is thus increased several hundred percent of its original volume, introducing micropores such that the finished product has "porosity" with the pore volume often accounting for a major portion of the total product volume. Increases in tensile strength in the direction of stretch are achieved which become substantial after sintering while holding in stretched condition.

The extrusion process itself is conventional as practiced in the industry and called "paste extrusion". Typically extrusion aid is admixed with the extrusion grade unsintered polytetrafluoroethylene powder in a proportion of 10 to 35% by volume. Preferably, the extrusion aid is V.M. & P. naphtha and is employed in 18% by volume. The resultant paste, which is formed by tumbling or a similar procedure, is pressed into a preform shaped to be received in the barrel of a ram extruder. In the extruder preform is forced through a die with substantial reduction in cross-section. Sheeting dies and calendering steps are commonly employed in conjunction with extrusion of the paste in order to obtain flat stock and in order to promote biaxial orientation of the fibers which are produced when unsintered polytetrafluoroethylene is extruded. Paste extrusion is also employed in manufacture of polytetrafluoroethylene insulated wire.

In producing low density sintered polytetrafluoroethylene the extrusion aid is removed from the extruded product by heating at mild temperatures to drive off the extrusion aid or by solvent leaching.

The product is then stretched in at least one direction, for example, by passing it in tape form over a roll travelling at a given speed and then to a capstan travelling at a faster speed such that the product is placed under tension and stretches between the roll and capstan. The stretching in length of the tape which takes place between the roll and capstan is not accompanied by any significant reduction in cross-section of the tape, thus, in effect increasing the volume and lowering the density of the material by stretching the spaces between the fibrous particles of polytetrafluoroethylene as well as elongating the fibers themselves.

The resulting low density polytetrafluoroethylene is soft and upon heating without restraint shrinks losing the microporosity achieved by stretching. It has been found, however, that if low density unsintered polytetrafluoroethylene is heated to sintering temperatures while restrained in stretched condition the porosity becomes set and is retained after cooling with a significant increase in tensile strength of the product in the direction of the stretch over the tensile strength of sintered product which has not been stretched.

Low density sintered polytetrafluoroethylene made as described above has been used in the manufacture of insulated cable by making low density sintered tape as described above, and then winding the tape helically with overlap about a conductor. Typically several layers of helical windings are positioned over the conductor. While the final insulated cable has the advantages of a "porous" dielectric in terms of significant weight reduction, size reduction and the like, the product has several drawbacks. The surface, naturally, is rough because of overlap in applying the helical servings of polytetrafluoroethylene tape. Consequently it cannot be color coded or otherwise marked as well as might be desired. The compression on the inner layers of tape caused by the tension imposed during winding the outer layers results in partial collapse of the inner layers (increase in density) which makes it difficult to control the impedance of the cable. Also the cable does not strip cleanly. Crossed fibers from the biaxially oriented wrapped tapes resist clean breakage. While the tapes adhere to each other the dielectric is discontinuous at tape boundaries.

It is accordingly an important object of this invention to provide a process for the manufacture of elongated low density sintered polytetrafluoroethylene products, such as polytetrafluoroethylene insulated cables in which the polytetrafluoroethylene is continuous and has a homogeneous, uniform density throughout. Further, the surface of the polytetrafluoroethylene product is smooth facilitating electroless plating techniques, and, when applied to cable as insulation the product can be cleanly stripped without pulling crossed fibers or the like.

It is also an important object of this invention to provide a simple process for the production of such low density sintered products in an integrated operation in which the extrusion, extrusion aid removal, stretching and setting operations are carried out in a single pass arrangement.

It is a further important object of this invention to provide a process for manufacturing electric cable insulated with low density sintered polytetrafluoroethylene in which the stretching of the insulation and its application to the cable core are carried out simultaneously.

These and other objects of this invention are achieved utilizing a manufacturing process essentially the same as that conventionally used in paste extrusion, in that the paste is conventionally preformed and thereafter extruded in a process in which the extrudate is passed through an extrusion aid removal zone and the resulting product is then passed to a sintering zone in a single pass operation. In accordance with the present invention, however, the product is drawn through the sintering zone at a rate of linear speed substantially in excess of the linear speed of extrusion, that is, the speed determined by volumetric rate of extrusion divided by the cross-sectional area of the die exit. In order to carry out this operation it is also necessary to restrain or otherwise control the speed of extrusion at the die exit such that the extrudate is extruded at the same volumetric rate as it is fed to the die. In other words, pulltrusion is avoided.

As the extruded product is extruded from the die exit at extrusion speed and passes to the sintering zone through which the product is drawn at a greater speed, the product is stretched to accommodate the difference in speeds as well as being drawn through the extrusion aid removal zone. This stretch desirably is made to occur after extrusion aid removal. Generally stretching is predetermined to occur after extrusion aid removal by passing the unsintered product through a heated stretching zone after the extrusion aid removal zone and prior to the sintering zone in which the temperature of the product is raised above that in the extrusion aid removal zone such that the tensile strength of the product is lower than in the extrusion rate removal zone. When the extrusion aid is a volatile material removed by heat the unsintered polytetrafluoroethylene product leaving the extrusion aid removal zone should be heated in the stretching zone to a temperature higher than that required for extrusion aid removal but less than 500° F. (260° C.) at which stretching becomes uncontrollable. Preferably temperatures of the product in the stretching zone should be between 250° F. (121° C.) and 450° F. (232° C.).

Extrusion aid removal is accomplished in a conventional manner. While this conceivably might be by solvent leaching it is more practical to remove a volatile extrusion aid, such as naphtha, by the use of heat. Heat can be supplied by the use of a hot air furnace or by the use of an electrical resistance heater such as CALROD, a proprietary electrical resistance heater, elements or lamps. Whatever, the temperature of the extrudate should be raised sufficiently high to ensure a volatilization of most of the extrusion aid in the length of time that the extrudate remains in the extrusion removal zone. The temperatures which must be achieved are, of course, dependent upon the thickness of the extrudate as well as the extrusion aid employed. Oven temperatures of 500° F. (260° C.) are typical when removing an extrusion aid such as V.M. & P. naphtha having a boiling range of about 246°-290° F. (119° C.-143° C.). With the use of volatile extrusion aids the heat of volatilization tends to keep the temperature of the paste at or below the boiling temperature of the extrusion aid until it is almost entirely removed.

The heat required to promote stretching can be supplied in similar fashion, and can be provided from the standpoint of apparatus by simple extension in length of the vaporizing oven used for removal of volatile extrusion aid. Oven tempratures of 500° F. are again appropriate.

After extrusion aid removal and stretching the low density extrudate must be passed through a sintering zone at which the temperature of the low density unsintered polytetrafluoroethylene is raised above the so-called sintering temperature, which normally is 327° C. (620.6° F.) Oven temperatures on the order of 700° F. are ordinarily satisfactory to achieve sintering temperature under typical conditions.

In drawing the product through the sintering zone it is necessary that the forces placed on the product to draw it should be applied in a manner that the product does not stretch during the gel state in the sintering zone. The tensile strength of polytetrafluoroethylene decreases as a function of temperature. At 500° F. the tensile strength is approximately one-half that at room temperature.

Thus in accordance with this invention tension is relieved on the product as it passes through the sintering zone by drawing the unsintered product after extrusion aid removal and stretching before entering the sintering zone at the same linear speed as the sintered product is drawn from the sintering zone. Thus the only tension placed on the product in the sintering zone is essentially that required to keep it in stretched condition.

The stretch of the polytetrafluoroethylene product which occurs is equal in length per unit time to the difference in linear rate of speed of the extrudate at the die exit and that of product passing through the sintering zone. If the linear rate of extrusion is 50 feet per minute and the drawing rate is 100 feet per minute, the stretch is 50 feet per minute or 100%. No loss in volume occurs as a result of extrusion aid removal, and no significant decrease in dimensions transverse to the direction of stretch occurs. It should be understood that normally in sintering a polytetrafluoroethylene product which has been formed by a process involving paste extrusion there is an increase in density from about 1.8 to about 2.2 with accompanying dimensional decrease. This decrease still occurs in the process of this invention. What is to be noted is that no significant dimensional decrease attributable to stretch occurs.

The process of forming low density sintered polytetrafluoroethylene articles in accordance with this invention is particularly adaptable to the formation of tubing and in particular to the application of low density sintered polytetrafluoroethylene about a wire conductor in the manufacture of electric cable. Conventional in-line extrusion equipment for application of polytetrafluoroethylene to a conductive core is utilized with the additional difference, however, that an opening for the core must be formed such that, as the extrudate and core exit the die the conductive core can slide within the extrudate. In conventional paste extrusion about a metallic wire conductor no such opening is formed and the extruded material is supplied with pressure to the outer surface of the conductive core. The formation of the necessary opening in accordance with this invention is accomplished using conventional extrusion apparatus for extruding polytetrafluoroethylene paste about a central conductor. In this apparatus a guide tube having a needle tip is employed to pass the conductor through the center of the preform out of contact with the paste until close to the point of entry of the conductor and paste into the land of the die. Conventionally the conductor and extruding paste are brought together as their speeds become approximately equal.

In extruding and stretching polytetrafluoroethylene about a conductor in accordance with this invention the needle tip is adjusted in position such that the tip is in the land of the die. In such position an opening is formed in the extrudate through which the central conductor slides. (The central conductor travels at the final speed of the sintered product which usually is greatly in excess of the extrusion speed).

For a more complete understanding of the practical application of this invention reference is made to the appended drawing in which:

FIG. 1 is a schematic elevation of an apparatus designed to extrude, stretch and sinter a low density polytetrafluoroethylene covering about a cable core;

FIG. 2 is a cross-section of the completed cable taken at line 2—2 in FIG. 1;

FIG. 3 is a longitudinal section through a portion of the apparatus shown in FIG. 1; and FIG. 4 is a fragmentary cross-section of another portion of the apparatus taken at line 4—4 in FIG. 1.

Referring more specifically to FIG. 1, the reference numeral 10 indicates the overall extrusion apparatus utilized to extrude polytetrafluoroethylene about a conductive core in the formation of low density sintered polytetrafluoroethylene insulation in accordance with this invention. Apparatus 10 basically includes an extruder 12 having a die 14, a vaporizing oven 16, a stretching oven 17 and a sintering oven 18.

Extruder 12 is a conventional ram extruder for inline extrusion of polytetrafluoroethylene extrusion paste shaped into an annular cylindrical preform P. Conductor wire W is fed through the center of the barrel of extruder 12 in which preform P is located out through die 14 located at one end of extruder 12.

Extruder 12 is vertically positioned with die 14 at its upper end, such that the conductor W and extruded tubing T of extrusion paste which overlies conductor W are drawn upwardly through tubular vaporizing oven 16 and tubular stretching oven 17 which are aligned vertically above extruder 12. For practical reasons, sintering oven 18, which is also tubular, is positioned parallel to vaporizing oven 16 and stretching oven 17. For this reason, as tubing T and wire W issue from the upper end of oven 17, they are carried around a turnaround wheel 20 to reverse the direction of travel of the extruder tubing T and wire W and also to offset the path of travel to bring tubing T and wire W vertically downward through the center of sintering oven 18.

Ovens 16, 17 and 18, which ae convection ovens, are provided with internal electrical resistance heating units 16a, 17a, and 18a, respectively, which can be controlled to produce internal oven air temperatures in excess of 700° F. Typically, ovens 16 and 17 are operated at 500° F., and oven 18 is operated at 700° F. such that volatile extrusion aid in the extrusion paste is driven off in oven 16, and the remaining polytetrafluoroethylene is super heated to 250°–450° F. in oven 17 and is sintered in oven 18.

At the lower end of sintering oven 18 the low density sintered polytetrafluoroethylene insulated cable C taken from oven 18 is drawn by a fleeter capstan 22. Capstan 22 has a drum 23 and fleeter wheel 24, drum 23 being driven by a motor 25. Drum 23 and wheel 24 are mounted to rotate on parallel axes with their surfaces spaced apart slightly. Cable C is wound in FIG. 8 fashion in peripheral grooves in drum 23 and wheel 24 and then taken off to a storage reel or the like.

Apparatus 10, as described above, except for the addition of oven 17, is conventionally employed in the extrusion of polytetrafluoroethylene coatings about wire conductors. The rate of speed at which the final insulated conductor C is drawn by capstan 22 is conventionally the same as the extrusion rate of paste in the form of tubing T, and of course is the same as the speed of wire W.

In order to adapt the conventional equipment to produce low density sintered polytetrafluoroethylene insulated cable in accordance with this invention the apparatus is modified by adding a pair of pinch rolls 30 and 31 which are driven in counterrotation by a motor 32. Rolls 30 and 31 are peripherally grooved, as indicated by the reference numerals 33 and 34, respectively, to receive the exterior of extruded tubing T in the nip formed between rolls 30 and 31. Motor 32 is connected to drive rolls 30 and 31 at the same counterrotating speeds such that the confronting surfaces of grooves 33 and 34 also travel at the same speed in the same direction in the nip between rolls 30 and 31.

Rolls 30 and 31 are positioned adjacent the exit of die 14 between die 14 and vaporizing oven 16 and are aligned with the path of travel of extruded tubing T such that tubing T is carried between grooves 33 and 34 which lightly contact the surface of tubing T, as can be seen in cross-sectional view FIG. 4, to nip and control the speed of tubing T. The pressure, however, must be less than would restrain the relative movement of wire W and tubing T.

In the conventional extruder 12, there is normally a long sleeve 13, known as a guide tube, sized to receive the conductor core to be coated, in this instance wire W, and to carry it through the center of preform P. Sleeve 13 normally terminates with a needle tip 13a within die 14 short of the land 15 of the die. Until wire W reaches land 15, its rate of speed is usually greatly in excess of the rate of speed of the paste from preform P as the latter is extruded toward die 14. Sleeve 13 functions to permit the relatively higher speed of wire W to be unimpeded by the slower movement of paste.

In accordance with this invention, however, the sleeve 13 is also utilized to form an opening in the extruded paste as the latter enters land 15 thus forming a tubing T of the extruded paste and functioning as a mandrel, so to speak. As seen in FIG. 3, which is a longitudinal section through the die, needle tip 13a of sleeve 13 is located well within die land 15, and, because of its slightly greater thickness than wire W, forms a bore in tubing T which has a diameter greater than the outside diameter of wire W.

In forming low density sintered polytetrafluoroethylene insulated cable in accordance with this invention the peripheral rate of rolls 30 and 31 is the same as the linear speed of extrusion of tubing T. The peripheral speeds of drum 23 and wheel 24 of capstan 22, however, are at a rate substantially in excess such that cable C is drawn at a rate substantially exceeding that of extrusion. Turnaround wheel 20 is normally free to turn as drawn by tubing T in contact with it. The tension on tubing T is sufficient to bind tubing T against wire W such that no relative movement between tubing T and wire W at the location of wheel 20 can take place. Wheel 20 thus turns with a peripheral speed determined by the speed of wire W, and hence of capstan 22. Tubing T is thus stretched between pinch rolls 30 and 31 and turnaround wheel 20 by an amount percentage-wise equal to the percentage difference in speeds of rolls 30 and 31 and turnaround wheel 20.

While in the illustrated apparatus pinch rolls 30 and 31 are used to control the linear speed of tubing T as it is drawn from die 14, it has been found that rolls 30 and 31 are not necessarily needed. In many cases the linear speed of tubing T exiting die 14 can also be controlled satisfactorily by extending needle tip 13a further into land 15 of die 14 such that the frictional resistance between land 15 and needle tip 13a imposes the drag on tubing T necessary to control its linear speed of exit from die 14. This has been found effective with solid (single strand) conductor wires W, but has not worked well with stranded wires W.

Tubing T is thus stretched while under tension imposed by the difference in linear speeds of tubing T between pinch rolls 30 and 31 or die 14 and wheel 20. This introduces porosity which is set upon sintering in oven 18. The degree of porosity achieved is directly proportional to the degree of stretch. Thus if the cable is drawn by capstan 22 at a linear rate about wheel 20 equal to twice the speed of extrusion and wire W is allowed to feed to extruder 12 at twice the rate of extrusion, the resultant cable C, as depicted in FIG. 2, is insulated with polytetrafluoroethylene insulation F which has 50% volume of micropores.

It has been found that preheating of the extruder and of the die to 200° F. (93° C.) to 350° F. (177° C.) raises the temperature of the paste to above room temperature and promotes smooth cell structure. Preheating, however, should be limited, as temperatures of the paste above about 200° F. results in reduction of final diameter and hence lower porosity of the final product. While evaporation of extrusion aid serves to keep the temperature of the extrudate below the boiling point of the extrusion aid, such evaporation cannot take place in the highly pressured environment of the extruder.

An apparatus 10 was set up as described with reference to FIG. 1 with the extruder barrel and die at temperatures approximately 100° F. in a machine equipped to take a preform 1" in diameter. A paste of T6C TEFLON, a proprietary extrusion grade polytetrafluoroethylene, having 18% by weight of V.M.& P. naphtha was formed into a preform 1" × 18" in length and loaded into the barrel of the extruder 12. The die 14 employed had a land 15 inside diameter of 0.041", approximately 3/16" long. Needle tip 13a had an outside diameter of 0.020" and an inside diameter of 0.010". A 33 AWG silver plated copper conductor (D=0.0071") was employed as wire W. Grooves 30 and 31 each had a radius of 0.020". Ovens 16 and 17 were identical, and each was a 10' length having 2" inside diameter. Oven 18 was made up of two such 10' lengths. Oven 16 and oven 17 were each heated to 500° F., and oven 18 was heated to 700° F.

Extrusion was commenced with both wire W and tubing T being extruded at the same speed of 40' per minute. When extrudate T was passing completely through the apparatus set up, rolls 30 and 31, which had not theretofore been touching the extrudate were brought into contact with it at the normal speed of 40' per minute. Capstan 22 was then brought up to 130' per minute, over a 20 to 30 second period. The tip 13a of needle 13 was adjusted in land 15 to a position at which wire W was just tight in the final sintered wire. As extrusion continued the product cable C which was so manufactured had a polytetrafluoroethylene insulation F with 70% voids and an outside diameter of 0.032", as compared with 0.035" which would have resulted in the absence of any sintering.

The cable C so manufactured had low density sintered polytetrafluoroethylene insulation F which was tightly adhered to wire W. Adjustment of the needle tip 13a controlled such tightness. Once the position of tip 13a was determined it was not necessary to reposition it for additional runs under the same speed conditions.

Other runs were also made using the same apparatus set up (but with different adjustment of tip 13a) at extrusion speeds of 25 and 30 feet per minute and wire W speeds of 80 and 100 feet per minute, respectively.

The insulation F was found to be continuous, without breaks as in the case of wrapped tape, with uniform density from the center out to the surface. The surface of insulation F was smooth and of uniform diameter. Although containing 70% voids, the appearance in section was homogeneous.

Although no modification was required of the conventional apparatus to enable control of speed of the unsintered product as it entered sintering oven 18, this would not necessarily be the case. If wire W were not present, for example, in the instance of manufacturing coreless tubing, motorized control of wheel 20 would be required to keep it at the same peripheral speed as drum 23. Where the ovens are all in-line pinch rolls like pinch rolls 30 and 31, but synchronized with capstan 22, can be used to prevent stretching in oven 18.

I claim:

1. A method of forming an elongated product of low density sintered polytetrafluoroethylene having a central core of inextensible material which comprises:
   A. forcing an extrusible mixture of unsintered polytetrafluoroethylene and extrusion aid through a die, while substantially reducing the cross-section of said mixture and forming a central opening in said mixture to extrude an elongated continuous tube formed of said extrusible mixture;
   B. passing an indefinite length of inextensible material through said central opening in said mixture and through said die into said tube;
   C. controlling the linear speed of said tube exiting from said die to hold the volumetric rate thereof at approximately the volumetric rate of said mixture passing through said die;
   D. thereafter passing said tube with said inextensible material therein in sequence through an extrusion aid removal zone, a stretching zone and a sintering zone;
   E. drawing said tube together with said inextensible material through said sintering zone at the same linear speed, said speed being in excess of the linear speed of said mixture exiting from said die;
   F. maintaining conditions in said extrusion aid removal zone effective to remove the extrusion aid in said mixture as said tube is passed through said extrusion aid removal zone;
   G. heating said tube in said stretching zone to a temperature above that in said extrusion aid removal zone but less than sintering temperature; and
   H. maintaining sintering temperature conditions in said sintering zone.

2. A method according to claim 1 which further includes controlling the linear speed of said tube entering said sintering zone at the same speed as that of said tube exiting said sintering zone.

3. A method according to claim 2 in which said linear speed of said tube exiting said die is controlled by passage between a pair of pinch rolls in peripheral rolling contact with said tube.

4. A method according to any of claim 1, claim 2 or claim 3 in which said extrusion aid is a volatile substance and said conditions in said extrusion aid removal zone include a temperature sufficient to volatilize said extrusion aid as said tube passes through said extrusion aid removal zone, and said temperature of said tube in said stretching zone is between 250° F. and 450° F.

5. A method according to claim 4 in which said extrusion aid is V.M. & P. naphtha.

6. A method according to claim 3 in which said inextensible material is an electric conductor.

* * * * *